Patented Feb. 12, 1929.

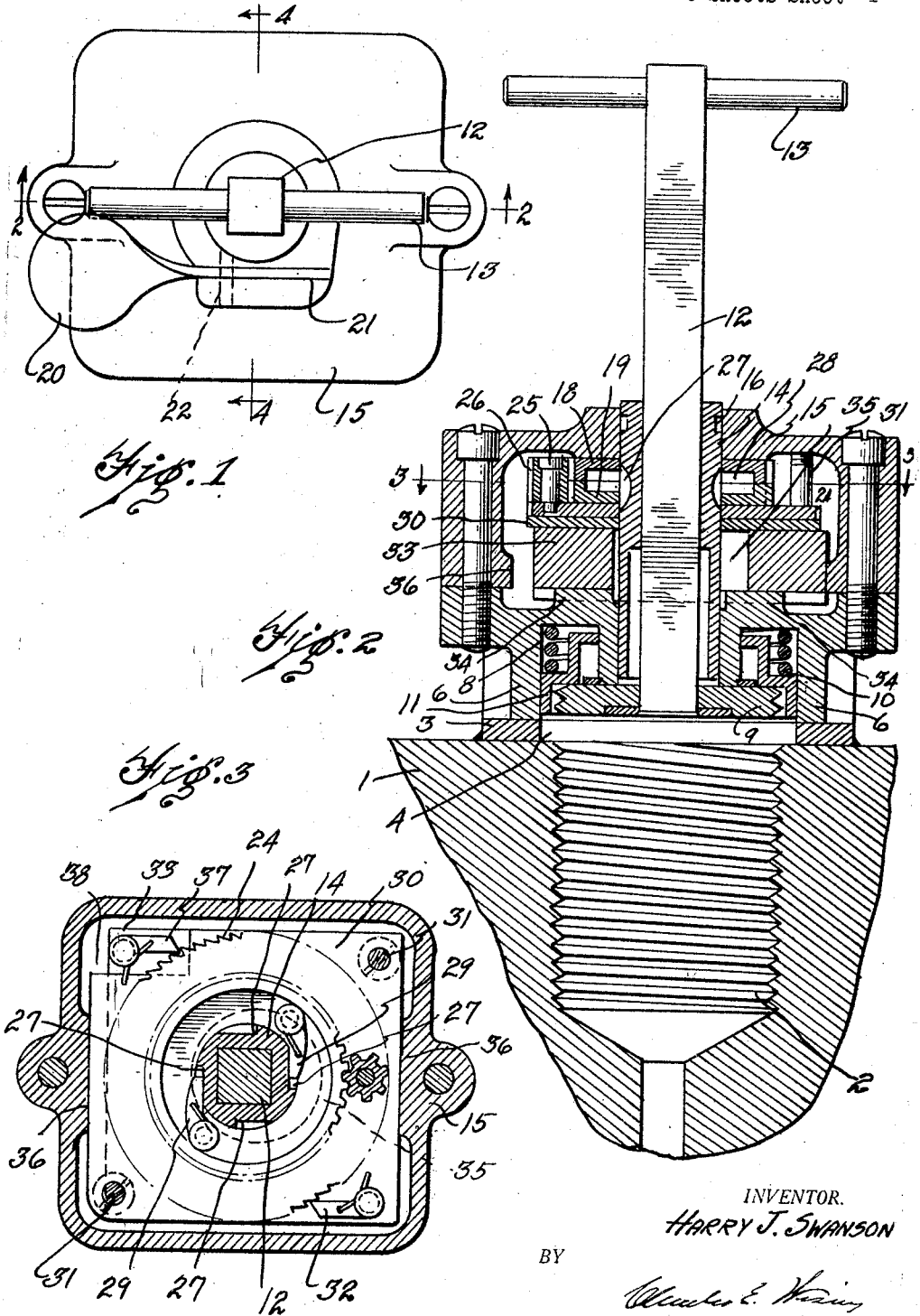

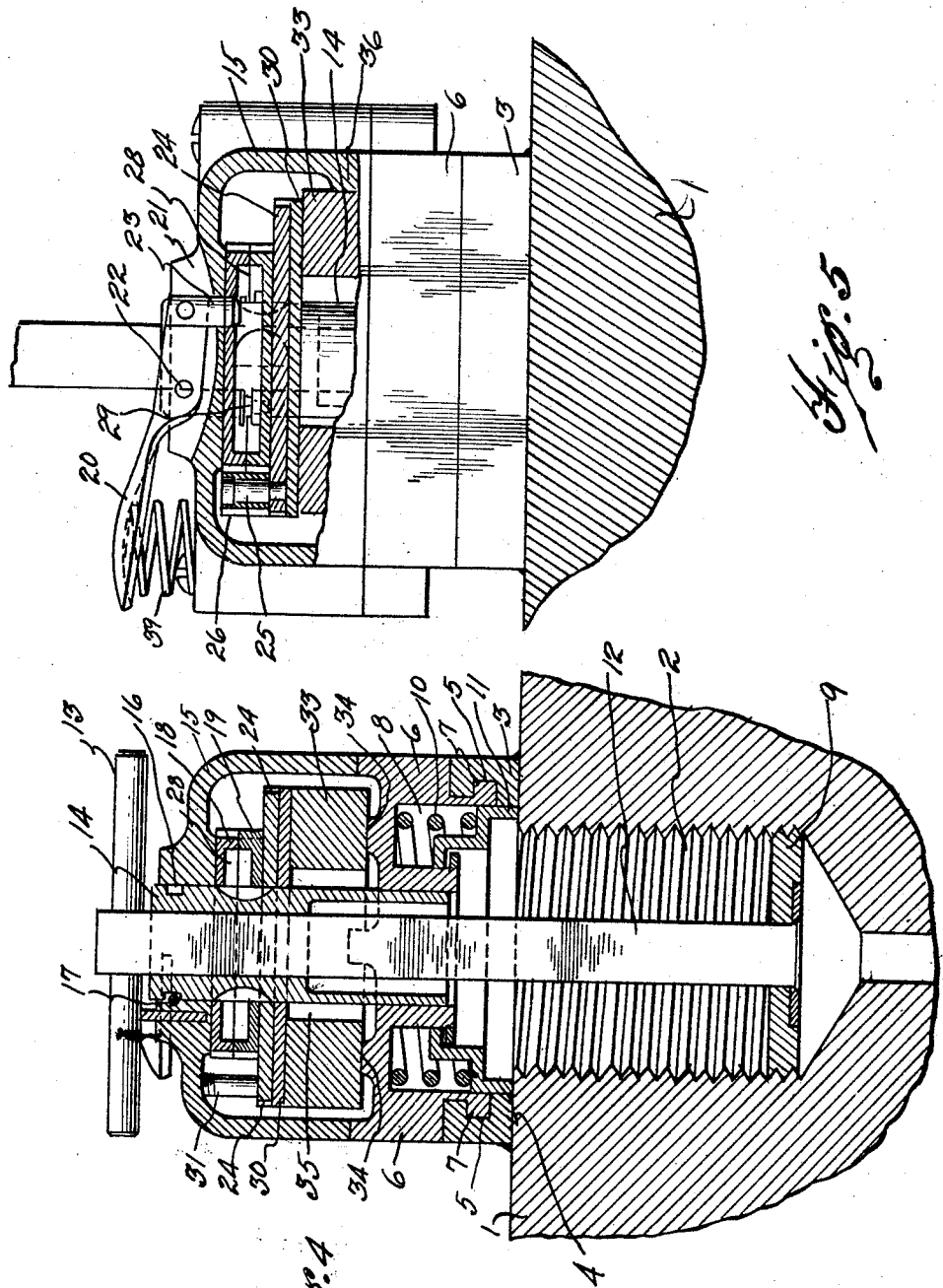

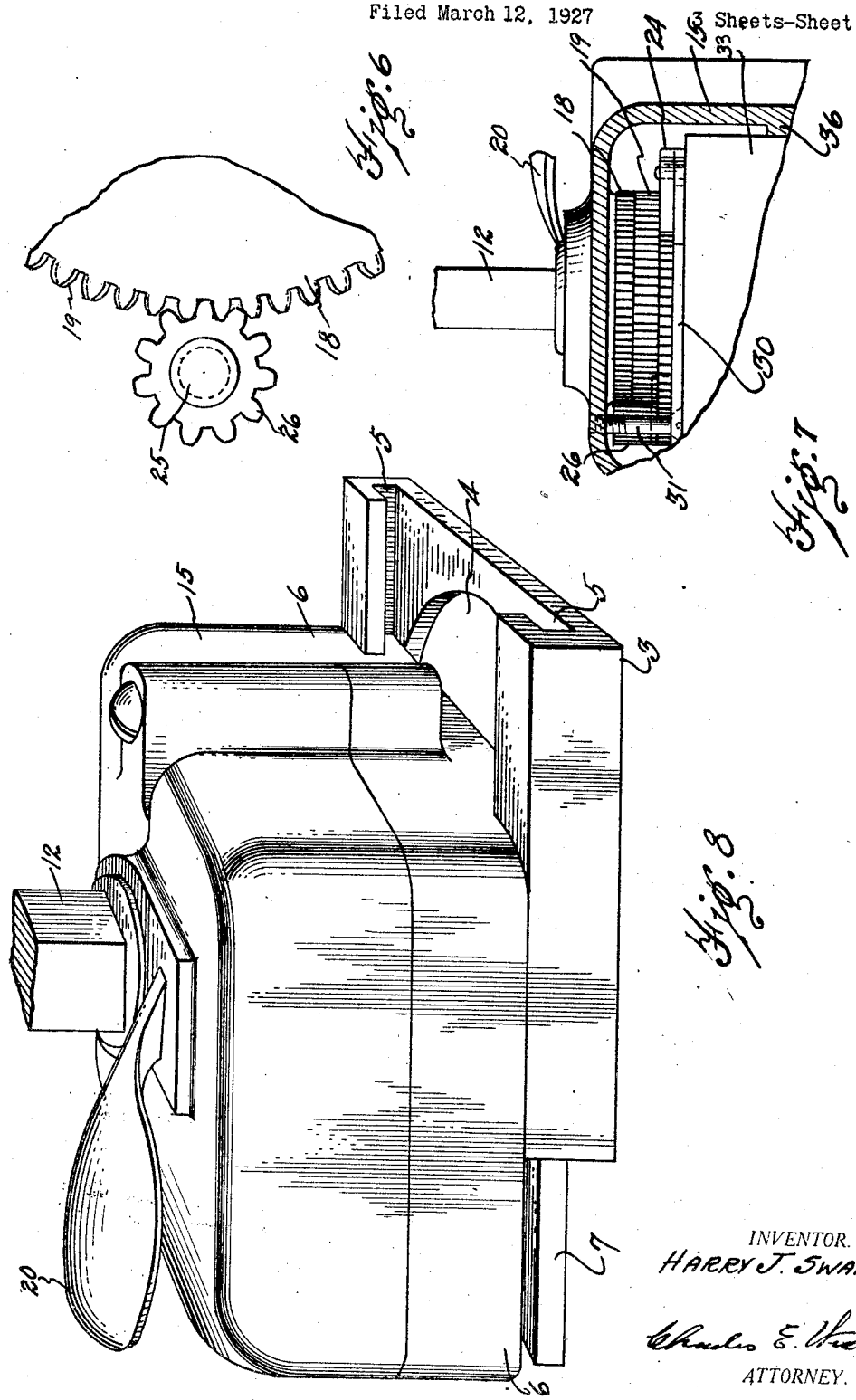

1,701,645

UNITED STATES PATENT OFFICE.

HARRY J. SWANSON, OF DETROIT, MICHIGAN, ASSIGNOR TO GENERAL SALES COMPANY, OF DETROIT, MICHIGAN, A CORPORATION OF MICHIGAN.

LOCOMOTIVE ROD-PIN LUBRICATOR.

Application filed March 12, 1927. Serial No. 174,893.

This invention relates to locomotive rod pin lubricators of that class in which the lubricator is actuated by reciprocation of the locomotive rod to feed lubricant to the crank pin in proportion to the speed of movement of the rod.

An object of the invention is to provide a new and improved mechanism for causing the lubricant to feed very slowly and that may be readily attached to or removed from the rod and is locked on the rod during operation.

A further object of the invention is to provide a lubricator of the character described comprising a plunger adapted to be threaded into a recess, the plunger being actuated by reciprocation of a weight which tends to turn a ratchet carrying a pinion meshing with two gears, one of said gears being held stationary while the other is movable and the movable gear being provided with one less tooth than the stationary gear, the movable gear being adapted to rotate the plunger so that it is threaded very slowly into the recess provided for the lubricant.

These objects and the several novel features of the invention are hereinafter more fully described and claimed and the preferred form of construction by which these objects are attained is shown in the accompanying drawings in which—

Fig. 1 is a plan view of a lubricator embodying my invention.

Fig. 2 is a section taken on line 2—2 of Fig. 1.

Fig. 3 is a section taken on line 3—3 of Fig. 2.

Fig. 4 is a section taken on line 4—4 of Fig. 1 showing the plunger.

Fig. 5 is an elevation partly in section showing the means for disengaging the plunger from operation.

Fig. 6 is an enlarged detail showing the pinion and the two gears in mesh therewith.

Fig. 7 is a view showing the two gears and pinion in elevation.

Fig. 8 is a perspective view of the lubricator showing the means for attaching the casing to the locomotive rod.

As shown in Figs. 2 and 4 the locomotive rod 1 is provided with an interiorly threaded recess 2 and a member 3 shown in Figs. 4 and 8 is welded or otherwise secured to the face of the rod and is provided with an aperture 4 positioned over the threaded recess 2. This member 3 is provided with ways 5 therein and the casing portion 6 is provided with a tongue 7 on each side riding in the respective way 5. The casing portion 6 is provided with a recess 8 therein which registers with the recess 4 in the member 3 as shown in Fig. 2 and as shown in Fig. 4 when the plunger 9 is threaded into the recess 2 the spring 10 in the recess 8 moves the member 11 downwardly so that it engages in the bottom of the recess 8 and aperture 4 and thus locks the casing portion 6 to the member 3. The plunger 9 is provided with a square stem 12 and this stem 12 is provided with a crossbar 13 in the upper end thereof. The stem 12 extends through a cylindrical member 14 which is rotatably mounted in the casing portions 6 and 15 and the member 14 is provided with an annular groove 16 in the upper end thereof and a pin 17 shown in Fig. 4 extends into this groove and prevents vertical movement of the member 14. Rotatably mounted on the cylindrical member 14 is a pair of gears 18 and 19, the gear 18 having one more tooth than the gear 19 and as shown in Figs. 1 and 5 a lever 20 is pivotally mounted in the slot 21 on the pin 22 and the end 23 of the lever 20 extends through an aperture provided therefor in the casing 15 and in the gear 18. This lever in the position shown in Fig. 5 holds the gear 18 from rotation while the gear 19 is freely rotatable about the member 14. Directly beneath the gear 19 is a ratchet 24 shown in Figs. 2, 3 and 5 and this ratchet is provided with a pin 25 on which a pinion gear 26 is rotatably mounted, the pinion 26 meshing with both gears 18 and 19. As the ratchet 24 is rotated the pinion 26 is moved about the periphery of both gears 18 and 19 and upon a complete rotation of the ratchet 24 the pinion 26 moves the gear 19 which has one less tooth than the gear 18 a distance of one tooth so that in order to produce a complete rotation of the gear 19 the ratchet 24 must rotate an equal number of times to the number of teeth on the gear 19. To communicate the movement of the gear 19 to the plunger the member 14 as shown in Figs. 2 and 3 is provided with four notches 27 and as shown in Fig. 5 a chamber 28 is provided between the gears 18 and 19 in which the spring pressed dogs 29 are pivotally mounted on the gear 19. These dogs engage in the notches 27 and turn the member 14 with the gear 19 and as the stem 12 fits in a square aperture in the member 14 the stem is turned therewith thus threading the plunger 9 into the recess 2. A plate 30 is supported directly beneath the ratchet 24 on the two bolts 31 which extend downwardly from the top of the casing 15 and the plate 30 carries a spring pressed dog 32 which engages in the teeth of the ratchet 24 and prevents reverse rotation of the ratchet. A block or weight 33 shown more particularly in Fig. 2 is supported beneath the plate 30 on the portions 34 of the casing part 6 and is provided with an enlarged aperture 35 about the member 14 so that the block cannot strike the member 14. This block is adapted to be reciprocated between the stop portions 36 of the casing 15 by reciprocation of the locomotive rod. Upon movement of the block 33 to the left of Fig. 3 the ratchet is not turned but upon succeeding movement to the right of Fig. 3 by reciprocation of the locomotive rod the dog 37 mounted on block 33 turns the ratchet 24 a distance of one tooth. By this arrangement the reciprocative movement of the locomotive rod is utilized to turn the ratchet 24 in a clockwise direction and this movement of the ratchet carries the pinion 26 about the gears 18 and 19 thus turning the movable gear 19 and dogs 29 which turn the member 14 and stem 12 and threads the plunger 9 into the recess 2. By this arrangement the threading of the plunger into the recess of the locomotive rod is very slow in proportion to the rotative movement of the ratchet 24 but the movement of the plunger while very slow is continuous during operation of the locomotive. As shown in Fig. 4 the cross bar 13 strikes the extending end of the lever 20 and depresses it against the tension of the spring 39 shown in Fig. 5 thus withdrawing the end 24 from the gear 18 so that the end 18 is freely rotatable about the member 14. At this time rotation of the ratchet 25 moves the pinion 26 about the periphery of the gears 18 and 19 but as both gears are freely rotatable at this time the gear 18 may turn in relation to the gear 19 which will remain stationary without rotating the member 14 and plunger stem 12. By this arrangement as the plunger reaches the bottom of the recess 2 the mechanism for driving the plunger is automatically disengaged. To return the plunger to the position shown in Fig. 2 it is only necessary to depress the end of the lever 20 while the plunger 9 is being unthreaded from the recess 2. The plunger 9 may be manually threaded into the recess 2 at any time by grasping the crossbar 13 and rotating the stem 12 and member 14 in a clockwise direction as will be understood from Fig. 3 which will cause the dogs 29 to disengage from the notches 27.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. A locomotive rod pin lubricator comprising a locomotive rod having an internally threaded recess for lubricant, a plunger adapted to be threaded into the recess to discharge the lubricant therefrom, a casing secured to the locomotive rod over the recess, the plunger being provided with a stem extending through the casing, a gear normally held in fixed relation with the casing, a rotatable gear beneath the fixed gear and having one less tooth than the fixed gear, a pinion meshing with both gears, a ratchet on which the pinion is rotatably mounted, a block within the casing adapted for limited reciprocal movement by reciprocation of the rod, a dog carried by the block and engaging the ratchet whereby reciprocation of the block rotates the ratchet, means carried by the movable gear for rotating the plunger stem therewith, and means for releasing the fixed gear to idle rotation.

2. A locomotive rod pin lubricator comprising a locomotive rod having an internally threaded recess for lubricant, a plunger adapted to be threaded into the recess to discharge the lubricant therefrom, a casing secured to the locomotive rod over the recess, the plunger being provided with a stem extending through the casing, a gear normally held in fixed relation with the casing, a rotatable gear beneath the fixed gear and having one less tooth than the fixed gear, a pinion meshing with both gears, a ratchet on which the pinion is rotatably mounted, a block within the casing adapted for limited reciprocal movement by reciprocation of the rod, a dog carried by the block and engaging the ratchet whereby reciprocation of the block rotates the ratchet, means carried by the rotatable gear for rotating the plunger stem therewith, a crossbar secured to the upper end of the plunger stem and means on the casing adapted to be engaged by the crossbar as the plunger reaches the bottom of the recess to release the fixed gear to free rotation.

3. A locomotive rod pin lubricator comprising a locomotive rod having a recess for lubricant, a plunger adapted for threaded relation with the recess, a member secured to the rod about the recess, a casing secured to the said member, the plunger being provided with a stem extending through the casing, a block within the casing adapted for limited reciprocal movement by reciprocation of the rod, a pawl carried by the block, a ratchet rotatably mounted in the casing and engaged by the pawl, a pinion gear carried by the ratchet, a pair of gears meshing with the pinion gear, one of said gears being adapted for rotating the plunger stem and the other of the said gears being normally held stationary in relation with the casing, the said stationary gear being provided with one more tooth than the other gear, and means for automatically releasing the stationary gear to free rotation as the plunger reaches the bottom of the recess.

4. A locomotive rod pin lubricator comprising a locomotive rod having an internally threaded recess for lubricant, a plunger adapted to be threaded into the recess to discharge the lubricant therefrom, a member secured to the face of the locomotive rod and having an aperture over the recess, the said member being provided with ways, a casing slidably mounted in the ways and having an aperture adapted to register with the aperture in the said member, a spring pressed member slidably mounted in the aperture of the casing and adapted to be moved by its spring into engagement in the aperture of the said member, a block within the casing adapted for limited reciprocal movement by reciprocation of the rod and means whereby reciprocation of the block is communicated by a gear reduction mechanism to rotate the plunger.

5. A locomotive rod pin lubricator comprising a locomotive rod having an internally threaded recess for lubricant, a plate provided with ways secured to the face of the locomotive rod and having an aperture therein over the recess in the rod, a casing slidably mounted in the ways and having a recess adapted to register with the aperture in the said member, a spring-pressed member slidably mounted in the recess, a plunger normally held within the recess and preventing movement of the spring-pressed member by the spring, the plunger being adapted to be threaded into the recess and in the rod, movement of the plunger into the recess of the rod allowing the spring-pressed member to extend from the recess in the casing into the aperture in the member on the locomotive rod, and means within the casing actuated by reciprocation of the locomotive rod for threading the plunger into the recess.

In testimony whereof I sign this specification.

HARRY J. SWANSON.